US008989280B2

(12) United States Patent
Burt

(10) Patent No.: US 8,989,280 B2
(45) Date of Patent: Mar. 24, 2015

(54) FRAME IDENTIFICATION

(75) Inventor: Donald V. Burt, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 593 days.

(21) Appl. No.: 13/173,303

(22) Filed: Jun. 30, 2011

(65) Prior Publication Data

US 2013/0003869 A1 Jan. 3, 2013

(51) Int. Cl.
*H04N 7/12* (2006.01)
*H04N 21/434* (2011.01)
*H04N 21/643* (2011.01)
*H04N 21/845* (2011.01)

(52) U.S. Cl.
CPC ......... *H04N 21/4344* (2013.01); *H04N 21/643* (2013.01); *H04N 21/8455* (2013.01)
USPC .................................. 375/240.26

(58) Field of Classification Search
CPC ............ H04N 21/4344; H04N 21/643; H04N 21/8455
USPC ........... 375/240.26, 240.06; 370/400; 386/95; 713/320, 143, 189, 324; 348/143; 707/3; 725/139; 455/438
See application file for complete search history.

(56) References Cited

U.S. PATENT DOCUMENTS

| | | | | |
|---|---|---|---|---|
| 5,715,176 A * | 2/1998 | Mobini | ........................ | 709/236 |
| 5,768,269 A * | 6/1998 | Rakib et al. | .................... | 370/342 |
| 5,923,811 A * | 7/1999 | Kawamura et al. | ........... | 386/241 |
| 6,529,617 B1 * | 3/2003 | Prokoski | ....................... | 382/128 |
| 7,804,774 B2 * | 9/2010 | Yang et al. | ..................... | 370/230 |
| 8,284,249 B2 * | 10/2012 | Feris et al. | ..................... | 348/143 |
| 8,452,981 B1 * | 5/2013 | Kiel et al. | ...................... | 713/189 |
| 8,683,542 B1 * | 3/2014 | Henry | ........................... | 725/146 |
| 2001/0023436 A1 * | 9/2001 | Srinivasan et al. | ............ | 709/219 |
| 2002/0035732 A1 * | 3/2002 | Zetts | .............................. | 725/148 |
| 2003/0033435 A1 * | 2/2003 | Hanner | ......................... | 709/247 |
| 2003/0043854 A1 * | 3/2003 | Uchide | ......................... | 370/498 |
| 2003/0053492 A1 * | 3/2003 | Matsunaga | .................... | 370/537 |
| 2004/0172655 A1 * | 9/2004 | Nishiyama et al. | ............. | 725/97 |
| 2005/0028193 A1 * | 2/2005 | Candelore et al. | .............. | 725/32 |
| 2005/0037759 A1 * | 2/2005 | Sipila et al. | ..................... | 455/438 |
| 2005/0086520 A1 * | 4/2005 | Dharmapurikar et al. | .... | 713/201 |
| 2005/0111547 A1 * | 5/2005 | Holcomb et al. | ........ | 375/240.03 |
| 2005/0171937 A1 * | 8/2005 | Hughes et al. | ..................... | 707/3 |
| 2005/0262560 A1 * | 11/2005 | Gassoway | ........................ | 726/22 |
| 2006/0098687 A1 * | 5/2006 | Singh et al. | ................... | 370/470 |
| 2006/0140127 A1 * | 6/2006 | Lee et al. | ....................... | 370/241 |
| 2006/0140280 A1 * | 6/2006 | Okada et al. | ............. | 375/240.28 |
| 2006/0184961 A1 * | 8/2006 | Lee et al. | ......................... | 725/32 |
| 2006/0234698 A1 * | 10/2006 | Fok et al. | ....................... | 455/425 |
| 2007/0086740 A1 * | 4/2007 | Kikuchi et al. | .................. | 386/95 |
| 2007/0180137 A1 * | 8/2007 | Rajapakse | ..................... | 709/231 |
| 2007/0248226 A1 * | 10/2007 | Chong et al. | ................... | 380/200 |
| 2008/0010654 A1 * | 1/2008 | Barrett et al. | ................... | 725/32 |
| 2008/0059991 A1 * | 3/2008 | Romano | ......................... | 725/19 |

(Continued)

*Primary Examiner* — Richard Torrente
*Assistant Examiner* — Joseph Suh
(74) *Attorney, Agent, or Firm* — Great Lakes Intellectual Property, PLLC.

(57) ABSTRACT

An unbound, out-of-band identification concept for identifying video frames and/or other data sets within a transport stream. The identification may include the use of reference markers to identify the video frames independently of a transmission protocol used to facilitate the transport stream. This type of ubiquitous generation of reference markings may allow the reference markers to be easily propagated and used with disparate transmission protocols and transport streams.

3 Claims, 2 Drawing Sheets

(56) References Cited

U.S. PATENT DOCUMENTS

| | | | |
|---|---|---|---|
| 2008/0134234 A1* | 6/2008 | Deiss et al. | 725/31 |
| 2008/0155491 A1* | 6/2008 | Van Dalen et al. | 716/18 |
| 2008/0285867 A1* | 11/2008 | Kajiwara | 382/233 |
| 2009/0067509 A1* | 3/2009 | Poon | 375/240.26 |
| 2009/0074382 A1* | 3/2009 | Itoh et al. | 386/95 |
| 2009/0092375 A1* | 4/2009 | Berry et al. | 386/95 |
| 2009/0097406 A1* | 4/2009 | Nilakantan et al. | 370/235 |
| 2009/0172767 A1* | 7/2009 | Li et al. | 725/139 |
| 2009/0185791 A1* | 7/2009 | Yahata et al. | 386/106 |
| 2009/0323554 A1* | 12/2009 | Arisoylu et al. | 370/254 |
| 2010/0027550 A1* | 2/2010 | Candelore et al. | 370/400 |
| 2010/0088717 A1* | 4/2010 | Candelore et al. | 725/32 |
| 2010/0146334 A1* | 6/2010 | Jacobsen et al. | 714/15 |
| 2010/0153758 A1* | 6/2010 | Esliger et al. | 713/320 |
| 2010/0174761 A1* | 7/2010 | Longobardi et al. | 707/809 |
| 2010/0306193 A1* | 12/2010 | Pereira et al. | 707/728 |
| 2010/0313214 A1* | 12/2010 | Moriya et al. | 725/12 |
| 2010/0322592 A1* | 12/2010 | Casagrande | 386/241 |
| 2011/0016405 A1* | 1/2011 | Grob et al. | 715/740 |
| 2011/0035769 A1* | 2/2011 | Candelore et al. | 725/32 |
| 2011/0047157 A1* | 2/2011 | Miki et al. | 707/737 |
| 2011/0088061 A1* | 4/2011 | Rowe | 725/35 |
| 2011/0134991 A1* | 6/2011 | Gregotski et al. | 375/240.01 |
| 2011/0154084 A1* | 6/2011 | Vandwalle et al. | 713/324 |
| 2011/0154488 A1* | 6/2011 | Rajan et al. | 726/22 |
| 2011/0205433 A1* | 8/2011 | Altmann | 348/513 |
| 2011/0208829 A1* | 8/2011 | Kwon et al. | 709/217 |
| 2011/0217989 A1* | 9/2011 | Fodor et al. | 455/456.1 |
| 2011/0230200 A1* | 9/2011 | Dimou et al. | 455/452.2 |
| 2011/0270653 A1* | 11/2011 | Gupta et al. | 705/14.4 |
| 2011/0317771 A1* | 12/2011 | Chen et al. | 375/240.25 |
| 2012/0071101 A1* | 3/2012 | Wentink et al. | 455/63.1 |
| 2012/0108269 A1* | 5/2012 | Howarter et al. | 455/456.4 |
| 2012/0158794 A1* | 6/2012 | DeBacker et al. | 707/803 |
| 2012/0243544 A1* | 9/2012 | Keesara | 370/395.53 |
| 2012/0272286 A1* | 10/2012 | Pasternak et al. | 725/146 |
| 2013/0136189 A9* | 5/2013 | Fu | 375/240.26 |
| 2013/0159477 A1* | 6/2013 | Danielsson et al. | 709/220 |

* cited by examiner

FRAME IDENTIFICATION

TECHNICAL FIELD

The present invention relates to identifying frames, such as but not limited to identifying video frames carried within a Moving Pictures Expert Group (MPEG) transport stream.

BACKGROUND

The present invention is predominately described with respect to addressing a need associated with supporting transport of television programs, video, audio and other media using the Moving Pictures Expert Group (MPEG) transmission protocol. The description of MPEG is provided as one example of one type of protocol that supports a frame-based delivery mechanism that is particularly benefited by the present invention. This is done, however, simply for exemplary purposes and without necessarily intending to limit the scope and contemplation of the present invention as the present invention fully contemplates it use with other frame-based transmission architectures.

FIG. 1 illustrates the frame-based nature of an MPEG transport stream 10. The MPEG transport stream 10 includes of a plurality of transport packets (TP). The transport packets are typically 188 byte data packets divided between a header and a payload (see lower portion of FIG. 1). The header, as described below in more detail, generally includes information related to facilitating use of the information included in the payload. The payload may be used to transport virtually any type of data, and for exemplary non-limiting purposes of the present invention, is shown for use in transport image frames of a television program or other media.

The image frames may be configured as one of an intra frame (I frame), a predicted frame (P frame) and a bi-directionally predicted frame (B frame). The use of the I, B, P frames is well known in the art and common to MPEG and other transport protocols. Once transported to an end device (not shown), the transport packets are decoded and the video frames included therein, which may be whole video frames or partial video frames, are processed according to the frame type to facilitate the desired output. Information included in the header may assist with the processing of the video frames included within the payload.

Various pieces of information may be included in the header depending on the transport protocol associated therewith. The headers shown in the MPEG illustration of FIG. 1 include a sync bit, a transport error indicator, a payload unit start indicator, a transport priority, a packet identification (PID), a transport scrambling control, an adaptation field control, a continuity counter, and an adaptation field, the nature of which is readily understood by one having ordinary skill in the art. Each of these header portions may include additional information as one having ordinary skill in the art will also appreciate. The adaptation field, for example, is shown to include additional information related to an adaptation field length, a discontinuity indicator, a random access indicator (RAI), an elementary stream priority indicator, 5 flags, optional fields, and stuffing bytes.

The end devices configured to process the header and frame-based payload information have traditionally included a player, decoder, or similar element having capabilities sufficient to output a rendering of the transported media. These devices have evolved over time to support operations beyond those associated with simply rendering the media for output. In some cases, the devices are able to execute application related operations, such as those associated with supporting interactive television/gaming, dynamic advertisement insertion, closed captioning, sub-titles, interactive messaging (e.g., text, SMS, MMS, email, etc.), web-browsing, and the like.

The execution of these types of applications, and many other operations associated with the end devices, may be reliant on identifying frames of a frame-based transport stream and/or synchronizing event timing relative to the frames of the frame-based transport stream. Accordingly, a need exists to facilitate identifying frames and/or to synchronize event timing.

SUMMARY

One non-limiting aspect of the present invention contemplates a method of identifying video frames carried within transport packets of a Moving Pictures Expert Group (MPEG) transport stream. The method may include associating video frames with a reference marker having a signature identifying a preceding transport packet having a RAI bit value of 1 and a count value identifying video frame positioning relative to the signature of the preceding transport packet.

One non-limiting aspect of the present invention contemplates generating the signatures uniquely from data included in a header of the corresponding transport packet.

One non-limiting aspect of the present invention contemplates representing the count value as a numerical value indicative of a number of video frames from which the corresponding video frame is spaced from the preceding transport packet.

One non-limiting aspect of the present invention contemplates determining an advertisement avail schedule, the advertisement avail schedule specifying advertisement avails within the MPEG transport stream relative to the signatures.

One non-limiting aspect of the present invention contemplates determining the advertisement avails to include an offset value, the offset value specifying a number of video frames from the signature at which the corresponding advertisement avail begins.

One non-limiting aspect of the present invention contemplates determining the advertisement avails to further include a duration value, the duration value specifying a number of video frames comprising the advertisement avail.

One non-limiting aspect of the present invention contemplates facilitating use of the advertisement avail schedule with a dynamic ad insertion application operating a device used to decode the MPEG transport stream for playback such that the dynamic advertisement insertion application relying on the advertisement avails specified in the advertisement avail schedule to schedule advertisement insertion during playback of the MPEG transport stream.

One non-limiting aspect of the present invention contemplates method of defining a video frame location for video frames carried within transport packets of a Moving Pictures Expert Group (MPEG) transport stream. The method may include processing the transport packets to identify the video frames included therein; identifying a plurality of the transport packets to be signature packets; generating a first signature for each of the signature packets; and defining a video frame location for each identified video frames relative to the signatures.

One non-limiting aspect of the present invention contemplates identifying the signature packets as the transport packets having a random access indicator (RAI) bit value of 1, and not the transport packets having an RAI bit value of 0.

One non-limiting aspect of the present invention contemplates defining the video frame location by relating each video frame identified between two successive signature packets to the first signature of a first one of the two successive signature packets.

One non-limiting aspect of the present invention contemplates defining the video frame location to include an offset value, the offset value specifying a number of video frames separating the corresponding video frame from the corresponding first one of the two successive signature packets.

One non-limiting aspect of the present invention contemplates relating advertisement avails to a plurality of the identified video frames by identifying a beginning video frame location for each advertisement avail according to the related first signature and the offset value of the corresponding one of the video frames.

One non-limiting aspect of the present invention contemplates relating application trigger events to a plurality of the identified video frames by identifying a trigger event video frame location for each triggering event according to the related first signature and the offset value of the corresponding one of the video frames.

One non-limiting aspect of the present invention contemplates instructing a device configured to process the MPEG transport stream for output to time execution of a plurality of operations relative to selected ones of the video frame locations such that the device separately and independently generating a second signature for the signature packets and determining the selected ones of the video frame locations to correspond with those where the first and second signatures match.

One non-limiting aspect of the present invention contemplates a computer-readable medium having stored thereon a plurality of instructions including instructions which, when executed by a processor, cause the processor to: synchronize operations specified in an operation schedule relative to a triggering video frame associated with a corresponding one of a plurality of video frames transported in one or more of a plurality of transport packets; determine signatures for one or more of the transport packets; and detect the triggering video frames as a function of the signatures.

One non-limiting aspect of the present invention contemplates having instructions which cause the processor to determine the signatures as a function of a header associated with each transport packet.

One non-limiting aspect of the present invention contemplates having instruction which cause the processor to determine the signatures as function of a random access indicator (RAI) bit value included in the header of each transport stream.

One non-limiting aspect of the present invention contemplates having instructions which cause the processor to determine the signatures for the transport packets having an RAI bit value of 1 and not for the transport packets having an RAI bit value of 0.

One non-limiting aspect of the present invention contemplates having instructions which cause the processor to determine the signatures as function of data included in an adaptation field of each header.

One non-limiting aspect of the present invention contemplates having instructions which cause the processor to: match the signatures to signatures previously associated in a signature table with operations to be executed relative to detection of certain signatures; and execute the operations associated with matching signatures.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 2:
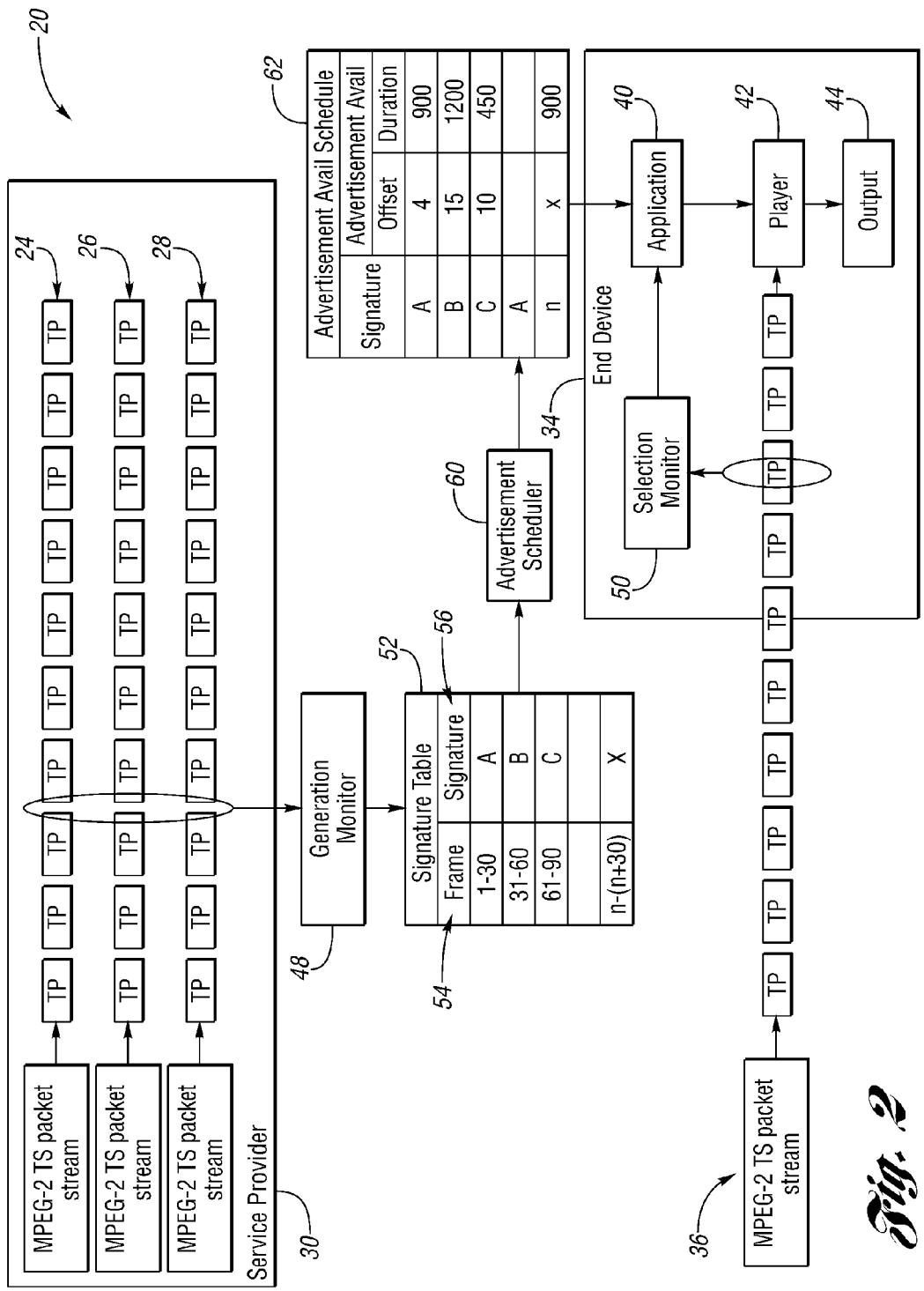
FIG. 2 illustrates a frame-based system as contemplated by one non-limiting aspect of the present invention.

FIG. 2 illustrates a frame-based system 20 as contemplated by one non-limiting aspect of the present invention operable to facilitate identifying frames and/or facilitating event timing relative to the frames. The system is predominately described with respect to identifying frames associated with Moving Pictures Expert Group (MPEG) transport streams (e.g., MPEG2 and MPEG4, the disclosures of which are hereby incorporated by reference in their entirety); however, the present invention fully contemplates its use with other frame-based and non-frame-based transport streams.

A plurality of MPEG transport streams 24, 26, 28 are shown as being processed by a service provider 30, such as but not limited to cable/broadcast/satellite television provider, internet service provider (high speed data provider), wireline/wireless/cellular telephone service provider, or other entity sufficiently operable to facilitate supporting transport of one or more transport streams 36 to an end device 34. The service provider 30 may be operable to process multiple transport streams 24, 26, 28 and to facilitate transmitting one or more of the transport streams 24, 26, 28 to the end device 34 over a suitable network and/or disc/download file transfer (not shown).

FIG. 2 shows the service provider 30 processing the transport streams and transmitting one of the three transports streams 36 to the end device 34. This is done for exemplary purposes only as the present invention fully contemplates the service provider 30 being operable to facilitate processing of any number of transport streams 24, 26, 28 and to facilitate transport of any number of transport streams 24, 26, 28 to any number of end devices 30. The illustrated transmission scenario may correspond with the end device 34, for example, requesting viewing of a television program or other media conducive to frame-based transmission, such as through a video on demand (VOD) platform, switched video broadcast (SVB) service, interactive television (iTV) service, a movie streaming service, etc.

The end device 34 may be any suitable device having capabilities sufficient to interface the received transport stream with a user thereof. The end device 34 may be a computer (laptop, desktop, tablet, etc.), personal digital assistant (PDA), media terminal adapter (MTA), mobile phone, settop box (STB), television, etc. The end device 34 is shown to include an application 40, a player 42, and an output 44. These elements may operate in concert to facilitating rendering the transported media with a user thereof. The application 40 and/or player 42 may include a computer-readable medium having stored thereon a plurality of instructions, including instructions which, when executed by a processor, cause the processor to control the end device 34 to facilitate executing the operations contemplated by the present invention.

The operation of the end device 34 is predominately described with respect to rending a television program carried in the transport stream 36 in a manner sufficient for viewing by a user. The application 40 may be configured to facilitate dynamic advertisements insertion during playback of the television program by facilitate advertisement insertion during certain advertisement avails identified within the transport stream 36. The present invention, of course, fully contemplates the application 40 being configured to support other operations instead of or in addition to the noted dynamic advertisement insertion, such as but not limited to operations associated with iTV, SVB, VOD, messaging, gaming, etc.

The present invention contemplates synchronizing advertisement to be inserted during playback by identifying video frames carried in the transport stream 36 during which the advertisements are to be inserted. Optionally, the synchronization process may be performed without solely relying on the transport stream 36 to self-identify the advertisement avails used to specify the advertisement insertion points. Some or all of the advertisement synchronization instructions used to identify the avails may be separately provided to the end device 34 so that the same transport stream 36 can be used with disparate end devices 34 to facilitate advertisement insertions, e.g., disparate devices like those operating according to OpenCable Application Platform (OCAP) and Enhance Television (ETV).

The frame-based identification contemplated by the present invention may be facilitated with the illustrated generation monitor 48 and selection monitor 50. The generation monitor 48 may be a device at the service provider 30, or otherwise in communication therewith, tasked with processing available transport streams 24, 26, 28 in a manner contemplated by the present invention to facilitate identifying transported video frames prior to playback at an end device 34. The selection monitor 50 may be a device included at the end device 30, or otherwise in communication therewith, that operates in cooperation with the generation monitor 48 to facilitate identifying the video frames according to the identification processes used by the generation monitor 48 to identify the video frames.

The identification information generated by the generation monitor 48 may be transmitted to the end device 34 separately from the transport stream 36. This may be done to decouple the video frame identification information from the transport stream 36 used to carry the video frames being identified. This type of decoupling may be beneficial in facilitating frame-based identification across multiple platforms and protocols without having to adjust the identification information according to the requirements of the transport stream 36 and/or operating system and protocols of the end device 34. The ubiquitous nature of this type of video frame identification may be beneficial in allow the identification information to be propagated across multiple mediums and asynchronously from the corresponding media. Of course, the present invention is not necessarily so limited and fully contemplates transmitting the identification information within the corresponding transport stream.

Figure 1:
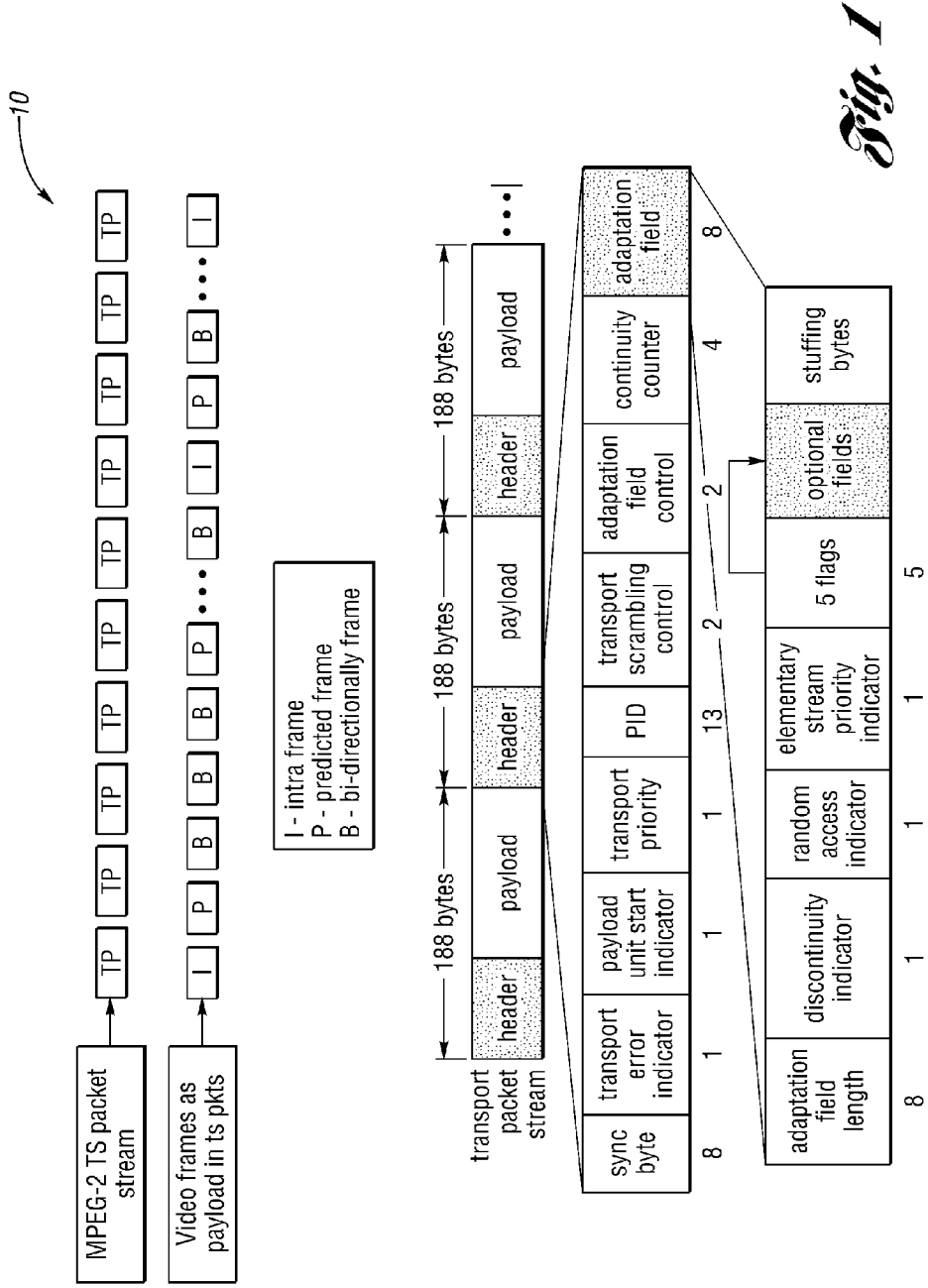
FIG. 1 illustrates an MPEG transport stream.

The generation monitor 48 may be configured to operate separately from a headend unit, server, or other service provider unit tasked with formatting the media to be carried within the MPEG transport streams 24, 26, 28. Alleviating the generation monitor 48 from the responsibility of formatting the television program or other media of the transport stream 24, 26, 28, i.e., segmenting the media in to the I, B, or P frames and correspondingly populating the header information fields (see FIG. 1), may be beneficial in insuring the security of the media, transport stream, etc. remains within the sole control of the service provider 30. Of course, the present invention is not so limited and fully contemplates the generation monitor 48 also being configured to generate the transport streams.

The identification information output from the generation monitor 48 may be in the form of a signature table 52. The signature table 52 may be used to relate a signature or other identification of certain transport packets with one or more of the video frames. The illustrated signature table 52 includes a frame column 54 and a signature column 56.

The frame column 54 identifies each frame associated with a particular piece of content included in the transport stream 36 to which the signature table 52 relates. The generation monitor 48 may assign a frame value to reference each of the I, B, and P frames relative to a first frame of the particular piece of content such that each frame is a assigned a unique value, which is shown with the first frame being assigned a value of 1 and each subsequent frame value being increased by a value of 1 until all the frames are identified. The generation monitor may be configured with a counter to facilitate assigning each video frame a reference number. Since some of the video frames may be spaced across multiple transport packets, the generation monitor 48 may he required to process each transport packet to identify the frames therein, as opposed to simply assigning the reference values to the corresponding transport packet as if the transport packets corresponded with a single frame.

The signature column 56 identifies a signature taken from a plurality of the transport packets identified to qualify as signature packets. The generation monitor 48 may identify the signature packets as some number of transport packets less than the total number of transport packets in order to optionally avoid the extra processing associated with generating the signatures. The signature packets may correspond with the transport packets having an RAI value of 1. The header of each transport packet includes an RAI value of one of 1 or 0 (see FIG. 1). The RAI value is a single bit named in the adaptation field (see, ISO 13818 Part 1, Section 2.4.3.5, the disclosure of which is hereby incorporated by reference in its entirety) which, when set to 1, indicates that the next frame is completely contained in the transport stream (bitstream) such that they can be decoded without reference to one or more previous frames (access units). The generation monitor observes the stream and detects transport packets with RAI bit set in the video PID. Whenever such a transport packet is located, the monitor makes a canonical copy of the packet, optionally with zeroes written into all fields that can have different values in a reprocessed stream (such as the continuity counter, peR or PTS values, etc.), and computes a signature for the canonical packet.

Typically, every thirty frame, or every video frame completing 1 second of video, has an RAI bit value of 1, although this can vary depending how the transport stream is generated. The intermediary frames are the frames of the transport packt an RAI bit value of 0 and designate the next frame as being partially contained in the transport stream 36 such that they cannot be decoded without reference to one or more previous frames. Tying the signature packets to the transport packets having the RAI bit value of 1, as opposed to the ones having an RAI bit value of 0, provides a reliable means of associating the signatures with data in the transport streams that remains constant as the transport stream is propagated to various end devices while at the same time eliminating the entire burden of assigning signatures to each packet, although the present invention fully contemplates doing so. The signature packets, however, may be identified through other means, such as by selecting the transport packets at particular intervals and as a function of unique reference values assigned to the transport packets.

The signatures may be generated by hashing or otherwise processing header and/or payload information of the corresponding transport packet. The signature could, for example, be a CRC-32. Since the size of each signature transport packet is nominally 188 bytes, and optionally since four or more bytes may be forced to zero, 174 bytes may contribute to the generated signature. This produces about $10^{17}$ distinct data patterns, and the CRC-32 will express them as $10^{9.6}$ signatures. Optionally, a large part of each signature transport packet may be adaptation bytes, which have much less variability than video data and could significantly reduce the value of this discriminator. The generation monitor may detect this, an if that proves to be true, the signature can instead be from the video PES packet identified by the RAI, which will have a vastly larger signature state except for the special case of black frames.

The signatures may be assigned to the signature table 52 relative to the frames included in the corresponding signature packet and those in included in the following transport packets, ending at the next signature packet, such that each frame between two successive signature packets is associated with a first occurring one of the two signature packets. In this manner, each of the identified frames is assigned to one of the signatures such that each signature relates to a certain range of frames. The relative positioning of each frame to the signatures can then be inferred from the numbers system used to identify the frames, i.e., frame 20 is offset from the frame of signature A (frame 1) by 19 frames. An offset value may optionally be generated to reflect the frame-wise distance of each frame from the frame of the related signature packet.

The signature table 52 identifies a positional location of each frame relative to one or more of the signature transport packets (e.g., a following signature packet can be referenced to a prior occurring frame with a negative offset value or the like). The signature table 52, advantageously, can be used to identify the positioning of each video frame without relying on proprietary information specific to the transport stream 24, 26, 28 or the operating system of the end device 34, i.e., without having to discover protocol specific information to generate a corresponding signature. Instead, the signatures may be generically generated from the video frames or non-proprietary portions of the header such that any system having capabilities to recover the video frames and to generate signatures may be able to similarly relate to the location of each frame.

This type of ubiquitous signature table 52 may be provided to any scheduler that needs to synchronize one or more application action with a specific frame in the transport stream. Without limitation, an example might be an advertisement scheduler 60 to facilitate the dynamic advertisement insertion discussed above. The advertisement scheduler 60 may be associated with the entity supporting the generation monitor 48 or some other entity tasked with supporting dynamic advertisement insertion. The advertisement scheduler 60 may be in communication with vendors and other advertisers desiring to place advertisement during playback of the television program or other media embodied in the transport stream 36. The advertisement scheduler 60 may receive signature tables 52 for a plurality of different transport streams 24, 26, 28 and/or media types for which the advertisement are desired for insertion.

The advertisement scheduler 60 may include a matching algorithm or other means for identifying the advertisements to be inserted during playback, and in some case, the particular point in the program at which the advertisements are to be inserted, generally referred to as an advertisement avail. The advertisement avails may be identified to the advertisement scheduler by a content source originating the media, the service provider, the advertisers, and/or some other entity. The advertisement avails may be identified to begin at a specific frame and last for a specified duration. The advertisement scheduler 60 may then use this information to generate an advertisement schedule 62 specific to the corresponding media and/or transport stream 36.

The particular point in the program might also be identified in other ways, such as by a particular time as an interval from the start of the program. If the transport stream 36 is being delivered at a constant frame rate, the conversion from time interval to frame is a deterministic computation, after which the advertisement scheduler proceeds as above. If the transport stream is not at a constant frame rate, this is readily implemented by the signature table 52 having an interval column indicating the interval from start-of-program associated with each signature. (In MPEG-2 for example, this might be the different in Presentation Time Stamps for the two frames.) If the frame rate changes between signatures, additional rows may be inserted in the signature yable 52 duplicating the signature but differentiating the frame offsets and intervals as necessary. These additional columns are used by the advertisement scheduler 60 to generate the same advertisement schedule 62 as would result in the constant bit rate case.

The illustrated advertisement schedule correspondingly identifies the insertion point for advertisement avails with a beginning frame defined by its offset from one of the signatures and optionally the duration (measured by the number of frames, i.e., 900 frames corresponds with an avail of approximately thirty seconds). The end device application 40 can then use this information to synchronize insertion of the corresponding advertisement. The particular advertisement to be inserted upon occurrence of the corresponding avail may optionally be specified in the advertisement schedule 62 or determined separately by the end device 34 and/or some other entity according to the particular user, media being shown, etc.

The selection monitor 50 of the end device 34 may cooperate with the application 40 or other element of the end device 34 to facilitate identifying the frames specified in the advertisement avail schedule 62. The selection monitor 50 may operate similarly to the generation monitor 48 in that it may be similarly configured to identify each frame carried in the transport stream with a corresponding reference value (count), to identify the signature frames (e.g., those having an RAI bit value of 1 or other indicator used by the generation monitor 48), and to generate the signatures according to the same methodology used by the generation monitor 48. Optionally, some communication may take place between the generation monitor 48 and the selection monitor 50 to facilitate apprising the other of the techniques used to identify the frames/signature packets and to generate the signatures.

The selection monitor 50 may act as a timing mechanism for the application 40 to synchronize advertisement insertion relative to the frames of interest. The synchronizing may be accomplished with the selection monitor 50 continuously reporting frame location information to the application during playback of the media. The selection monitor 50 may be a reader-type device configured to report frame location information to the application 40 just prior to the frames being processed by the player 42 for output. The frame location information may correspond with identification of the last signature and/or with the count of the current frame relative to the last signature frame.

The selection monitor 50, optionally unlike the generation monitor 48, may not need to specifically identify each frame in the transport stream relative to the other frames, e.g., by generating or keeping track of a unique reference frame value determined relative to a first frame in the transport stream 36. The selection monitor 50 may more simply identify the frame currently being read relative to its position to the last signature frame, as opposed to its relation to the first frame of the transport stream 36. The application 40 may then be configured to relate that signature and/or frame to the advertisement avail schedule to facilitate advertisement insertion. While the operation of the selection monitor 50 and the application 40 are shown to be separate, their operations may be combined or otherwise integrated to facilitate the contemplated operations. Moreover, while the frame location information is shown to be used by the application 40 to facilitate synchronizing advertisement insertion, this information may be used to trigger/synchronize any application or operation of the end device (e.g., closed captions (CC), sub-titling, and Emergency Alert System (EAS), gaming, etc.).

The selection monitor 50 may be configured to generate the location information independently of other application specific information that may be included within the transport stream 36. The transport stream 36, for example, may include embedded application specific information that may not be read and/or reported by the selection monitor 50, e.g., formatting characteristics of the advertisement to be inserted, messaging requirements to interactively communicate user responses to the advertisements, and/or other types of information that may be required by the application 40 and/or the player 42 to facilitate the advertisement insertion or the other operations triggered with the frame identification information.

While the foregoing generally describes an unbound, out-of-band process for frame identification that is independent of certain information being embedded within the transport stream, i.e., not dependent on in-band data, the present invention also contemplates relying on either Program Clock Reference values or Presentation Time Stamps, derived from PCR, and/or specific transport data carried in PIDs (in-band) to facilitate frame identification. The out-of-band identification, however, may be more beneficial since some of the in-band required data may be lost in the event the stream is filtered to retain only the audio and video data, such as when stored in a personal video recorder (e.g., SCTE-35 marker lost due to their PID not being saved). The in-band identification may also be problematic if the stream is recomposed under a new system clock, which could invalidate external identifiers that used stream timing references.

An ability to extract SCTE-35 markers from a cable MPEG stream and subsequently insert ads in an IP audio and video only version of the stream may be supported with synchronization mechanism of the present invention. A similar situation may apply when a cable program is recorded at the client and it is desired to dynamically overwrite the recorded ad, since only audio and video PIDs may be preserved a DVR. Similar issues occur if specific application behavior needs to be synchronized with video playback, such as presenting a buy opportunity when a particular product appears in the content. Unlike the in-band options, the out-of-band method may be more durable over PID filtering and system clock regeneration of the audio and video stream. Further, the out of band method may be completely passive, which is a valuable characteristic for programmers and advertisers, as it cannot compromise the quality or integrity of the program content. The in-band identification, however, may be more beneficial than the out-of-band identification in the event the stream is re-encoded as the re-encoding can destroy the data of the video PES packet used to generation the signatures.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of identifying video frames carried within transport packets of a Moving Pictures Expert Group (MPEG) transport stream, the transport packets including a random access indicator (RAI) bit value of one of 0 and 1, the RAI bit value being set to 1 when indicating the corresponding transport packet contains a complete or a beginning of a new video frame and set to 0 when indicating the corresponding transport packet contains a partial video frame, the method comprising:

associating video frames with a reference marker, each reference marker including a corresponding signature and a corresponding count value, the signature identifying a preceding transport packet having a RAI bit value of 1, the count value identifying video frame positioning relative to the signature of the preceding transport packet;

generating the signatures by separately hashing fields included in a header of the corresponding transport packet, including generating the signatures without hashing any portion of a video frame at least partially included in a payload of the corresponding transport packet, including zeroing at least a continuity counter and a presentation timestamp (PTS) included as at least part of the fields;

representing the count value as a numerical value indicative of a number of video frames from which the corresponding video frame is spaced from the preceding transport packet having the related signature;

storing each reference marker, including each signature and count value, in a signature table and subsequently transmitting the signature table separately from the transport stream to a device processing the transport stream for output to a display;

determining an advertisement avail schedule, the advertisement avail schedule specifying advertisement avails within the MPEG transport stream relative to the signatures;

determining the advertisement avails to include an offset value, the offset value specifying a number of video frames from the related signature at which the corresponding advertisement avail begins;

facilitating use of the advertisement avail schedule with a dynamic advertisement insertion application operating on a device used to decode the MPEG transport stream for playback, the dynamic advertisement insertion application relying on the advertisement avails specified in the advertisement avail schedule to schedule advertisement insertion during playback of the MPEG transport stream; and generating the signatures for the transport packets having the RAI bit value of 1 and not for the transport packets having the RAI bit value of 0.

2. A method of defining a video frame location for video frames carried within a plurality of transport packets of a Moving Pictures Expert Group (MPEG) transport stream, each of the plurality of transport packets including a random access indicator (RAI) bit value of one of 0 and 1, the RAI bit value being set to 1 when indicating the corresponding transport packet contains a complete or a beginning of a new video frame and set to 0 when indicating the corresponding transport packet contains a partial video frame, the method comprising:
- processing the transport packets to identify the video frames included therein;
- identifying a portion of the plurality of transport packets to be signature packets;
- generating a first signature for each of the signature packets;
- defining a video frame location for each of the plurality of video frames relative to the first signatures;
- identifying the signature packets as the portion of the plurality of transport packets having the RAI bit value of 1, and not the transport packets having the RAI bit value of 0, such that the transport packets having the RAI bit value of 0 are not identified as signature packets
- defining the video frame location within a signature table by relating each video frame to the first signature of a preceding one of the signature packets, the signature table being stored separately and independently from the transport stream such that access to the signature table is required in order to determine the video frame location;
- defining the video frame location within the signature table to include an offset value, the offset value specifying a number of video frames separating the corresponding video frame from the corresponding first preceding signature packet;
- relating advertisement avails to a plurality of the video frames identified in the signature table by identifying a beginning video frame location for each advertisement avail according to the related first signature and the offset value of the corresponding one of the video frames; and
- instructing a device to time advertisement insertion during one or more of the advertisement avails relative to selected ones of the video frame locations, the device being transmitted the signature table and configured to process the MPEG transport stream for output to a display, the device separately and independently generating a second signature for the signature packets and determining the selected ones of the video frame locations for advertisement insertion to correspond with those listed in the signature table where the second signatures match with a corresponding of the first signatures.

3. A non-transitory computer-readable medium having non-transitory instructions operable with a processor to facilitate inserting advertisements during playback of video frames carried within a plurality of transport packets of a Moving Pictures Expert Group (MPEG) transport stream, each of the plurality of transport packets including a random access indicator (RAI) bit value of one of 0 and 1, the RAI bit value being set to 1 when indicating the corresponding transport packet contains a complete or a beginning of a new video frame and set to 0 when indicating the corresponding transport packet contains a partial video frame, the non-transitory instructions being sufficient for:
- identifying a portion of the plurality of transport packets to be signature packets, the signature packets being identified as the portion of the plurality of transport packets having the RAI bit value of 1, and not the transport packets having the RAI bit value of 0, such that the transport packets having the RAI bit value of 0 are not identified as signature packets, a first signature having been previously associated with each of the signature packets;
- determining a video frame location for each of the plurality of video frames relative to the first signatures, the video frame location being defined within a signature table sufficient to relate each video frame to the first signature of a preceding one of the signature packets, the signature table being stored separately and independently from the transport stream;
- determining the video frame location within the signature table to include an offset value, the offset value specifying a number of video frames separating the corresponding video frame from the corresponding first preceding signature packet;
- relating advertisement avails to a plurality of the video frames identified in the signature table by identifying a beginning video frame location for each advertisement avail according to the related first signature and the offset value of the corresponding one of the video frames; and
- timing advertisement insertion during one or more of the advertisement avails relative to selected ones of the video frame locations, including separately and independently generating a second signature for the signature packets when processing the MPEG transport stream for output to a display, including determining the selected ones of the video frame locations for advertisement insertion to correspond with those listed in the signature table where the second signatures match with a corresponding one of the first signatures.

* * * * *